Aug. 24, 1937.  B. B. GREEN  2,090,792
MOTH EXTERMINATOR
Filed Nov. 22, 1935  3 Sheets-Sheet 2

INVENTOR
B. B. Green
BY
ATTORNEY

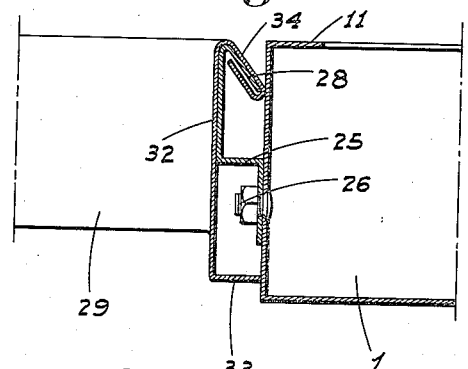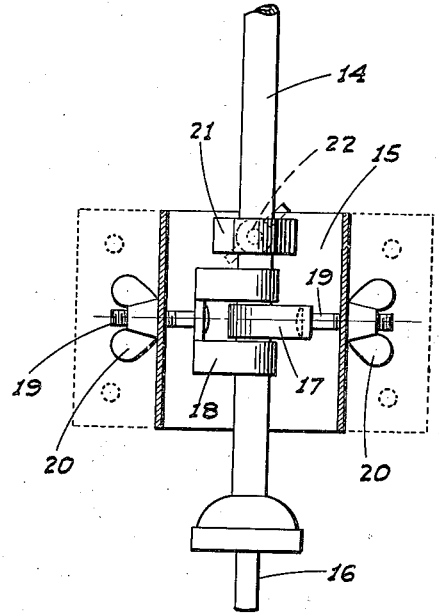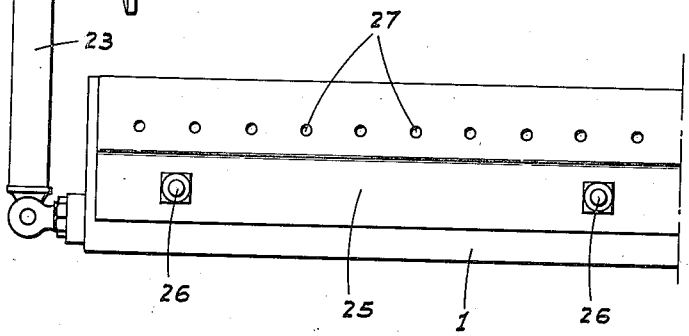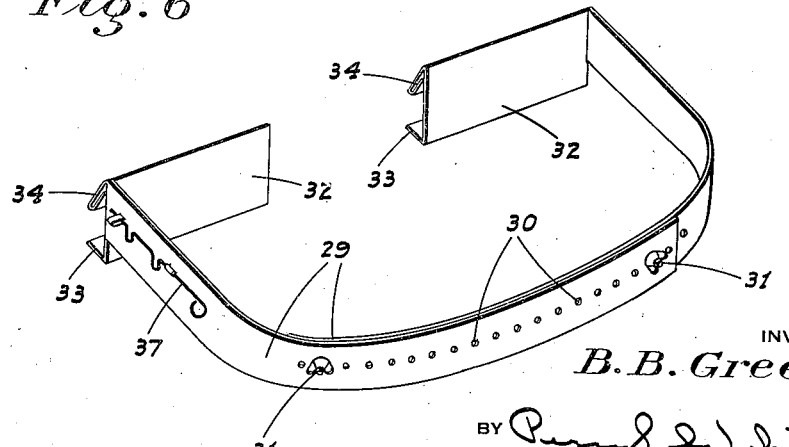

Patented Aug. 24, 1937

2,090,792

UNITED STATES PATENT OFFICE 2,090,792

MOTH EXTERMINATOR

Beckman B. Green, Courtland, Calif.

Application November 22, 1935, Serial No. 51,054

9 Claims. (Cl. 43—113)

This invention relates to moth exterminator devices, being particularly the design for use in exterminating moths in pear orchards and the like, so as to ultimately eliminate the damage to trees now occasioned as the result of the presence of these pests.

At present attempts are made to control damage from moths by spraying, but this is a time-taking and expensive operation and, as is well known to orchardists, the effectiveness of this method cannot be relied upon and as a whole, it has proven unsatisfactory.

The principal object of my invention is to provide an exterminator adapted to be placed in an orchard between the trees, and arranged to attract moths thereto both by day and night, and which will positively cause the extermination of practically all moths reaching the exterminator, and which will attract them from a considerable distance.

My improved exterminator is simple and inexpensive of construction, so that a number of them may be used in an orchard without heavy expense to the orchardist. Also, they require attention only at infrequent intervals and are very economical to operate.

Other objects of my invention will be apparent from the description now to follow, taken in connection with the accompanying drawings, in which Figure 1 is a top plan view of the exterminator.

Figure 3 is an enlarged fragmentary cross-section showing the sliding mounting of the bait pan on the supporting strip of the main pan.

Figure 4 is a back view of the lamp arm supporting and adjusting means.

Figure 5 is a fragmentary front elevation of the main pan showing one of the reflectors.

Figure 6 is a perspective view of the adjustable bait pan supporting unit detached.

Figure 1:
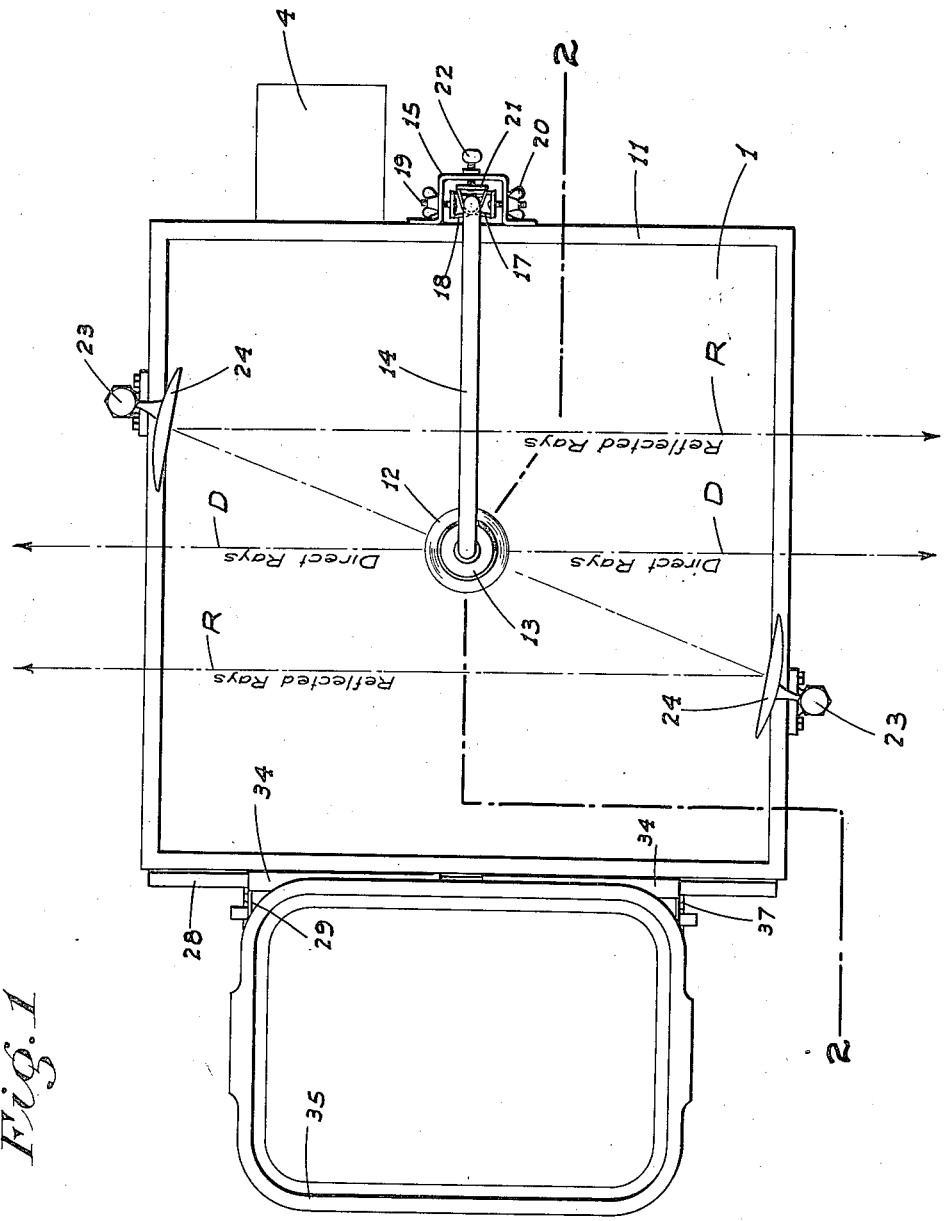

Referring now more particularly to the characters of reference on the drawings, the numeral 1 comprises a main pan, preferably rectangular and having a central bottom outlet from which a threaded nipple 2 depends. This nipple projects through an opening in a platform 3 which is erected on a post 4 to one side of the same and about six feet or so from the ground.

A nut 5 on the nipple below the platform engages a large washer 6 which covers the opening and clamps the pan on the platform, so that it cannot be dislodged by wind in stormy weather. A cap 7 is removably mounted over the lower end of the nipple and has a petcock 8 depending therefrom.

The pan is adapted to contain liquid to a level near the top, said liquid comprising an upper layer of oil 9 floating on a larger body of water 10. The oil should be black or nearly so, so as to have good light-reflecting properties. Crankcase oil gives excellent results and is extremely cheap to obtain, even if a supply from the orchard vehicles is not available without additional cost. Any oil having the necessary reflecting properties can, however, be used instead. The use of water in addition to the oil avoids the need of a large volume of oil and any excess water, such as is apt to accumulate in the pan by reason of rain-fall, may be drained off by opening the petcock. When it is desired to entirely drain or clean out the pan, the cap is removed which, of course, allows a much larger flow from the pan.

An inturned flange 11 surrounds the pan about its rim, which not only stiffens the pan, but serves as a splash plate or baffle, preventing the oil from spilling over the sides of the pan when agitated by a high wind.

An unshaded electric light bulb 12, preferably of a high power vibrator type, is disposed over the pan centrally of its area. This light depends from the usual form of socket 13 which is supported from the adjacent end of a tubular arm 14 through which the necessary wires extend. This arm arches over to the back of the pan and then down the outside of the same and through an open-ended housing 15 mounted on the back of the pan; the adjacent portion of the arm being straight. A male plug element 16 is mounted on the lower end of the arm below the housing and pan, for connection to a cooperating plug element on the current supply cord.

Figure 2:
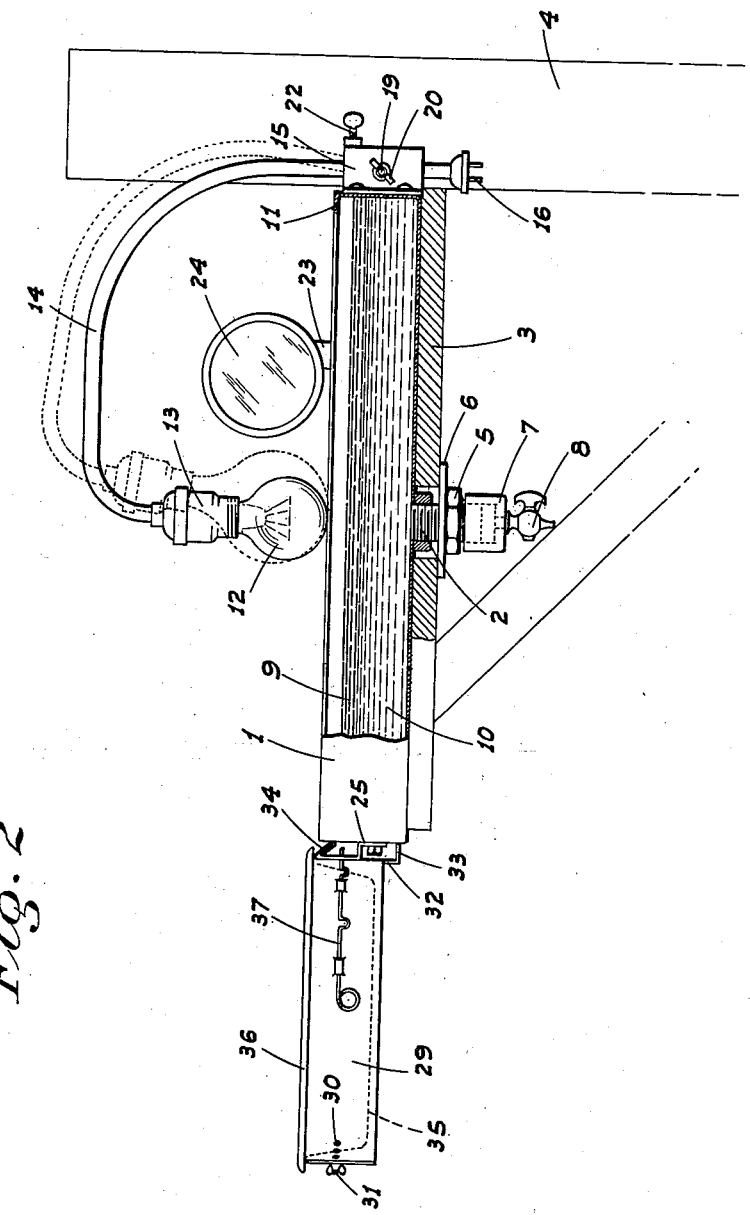
Figure 2 is a transverse section of the same on the line 2—2 of Figure 1.

The light is disposed so that the bottom of the same is but a short distance above the liquid, as shown at Figure 2. This position has been found to be a very important factor in the success of the exterminator, since moths attracted to and contacting the light are then so close to the oil that a very slight movement of the moths causes them to contact the oil, and they are then, of course, positively trapped and so exterminated, since they cannot fly out of the oil. The trapped moths then become gradually submerged in the oil and finally drop through to the water, leaving the top surface of the oil clean so that it retains its reflective properties. The light shining directly down onto the oil, the latter throws back a strong reflection which also attracts moths directly to the oil from above and serves as a further aid in their extermination.

The lamp arm is adjustably supported so that the lamp can always be disposed in a proper position relative to the oil, regardless of the size of the lamp or of the exact level of the liquid in the pan, by the following means:

Surrounding the arm within the housing 15 are opposed yokes 17 and 18 arranged in straddling relation to each other and in which said arm is both turnable and slidable. Stems 19 are swivelly connected to and project from the yokes in axial alinement with each other and parallel to the back side of the pan; said stems extending through the opposite sides of the housing and having adjusting nuts 20 threaded thereon. Engaging the arm 14 above the yoke 18 is another yoke 21 in which the arm is also turnable and slidable. A screw-stem 22 projects from this yoke and through a tapped boss in the back of the housing.

It will thus be seen that by advancing both nuts 20 a clamping pressure to hold the arm from sliding or turning will be applied to said arm from opposite directions. Advancing or retracting the stem 22 causes the arm to swing about the stems 19 as an axis, thus raising or lowering the light 12 at the outer end of the arm, as will be evident. If a greater movement of the light is desired, it is only necessary to loosen the yokes 17 and 18 and slide the arm up or down. This adjustment feature enables a very accurate positioning of the light relative to the oil to be obtained and is the secret of success of my exterminator.

I have shown by dotted lines in Figure 2 just how the adjustment of arm 14 by stem 22 may be carried out to a degree to admit of the use of a larger lamp than that shown, and still maintain the finesse of adjustment of the position of the lamp relative to the reflective fluid.

Swivelley mounted on and upstanding from the opposite sides of the pan in staggered relation to the direct horizontal rays of light D, which extend parallel to the back or front of the pan, are standards 23. On the upper end of the standards, at approximately the same level as the light, reflectors 24 of suitable character are mounted for universal adjustment, said reflectors being disposed in substantially vertical planes.

These reflectors are adjusted relative to the light 12 so that one reflector will direct reflected rays R in one direction substantially parallel and to one side of the light and of the direct rays D; while the other reflector will throw reflected rays R in the opposite direction substantially parallel to said direct rays D and on the opposite side of the same, as indicated in Figure 1.

The pan is set on the platform so that said rays shine lengthwise along the space between adjacent rows of trees. By reason of the arrangement defined, absolute control of the direction of the light rays is obtained and the exterminator has a six light attracting efficiency at the cost of one, since only one current consuming light is actually used.

Looking between the rows from beyond the exterminator on opposite sides the actual light and the reflected lights from the corresponding reflectors 24 behind will be plainly visible. Looking down on the pan the rays from the actual light and the reflected rays from the oil are also visible. The light used is of sufficient power for the rays to attract moths from a distance of approximately 150 feet either way from the pan.

For proper coverage of an orchard, exterminators would be mounted between the different rows of trees in such spaced relation to each other (about every 300 feet) so that there is no blind area. In this manner all moths flying in the adjacent territory will be attracted to the exterminator. With such an arrangement it is of course a simple matter to wire the lights of all the exterminators together so that the operation of all the lights may be controlled by a single switch.

The above structure is serviceable for night use, at which time the moths are mostly in evidence. For daytime use, but also serving as a valuable adjunct to attract the moths at night, I provide the following attachment:

Extending along the front of the pan is a rigid strip 25. The lower portion of this strip contacts the pan and is removably secured thereto by studs 26 projecting outwardly from the pan. The upper portion of the strip while parallel to the side of the pan, is spaced therefrom and is provided with a row of holes 27. Said portion is also formed along its upper edge with an inwardly and downwardly angled flange or tongue 28 which terminates clear of the pan. A pair of flexible straps 29 overlap each other for a portion of their length and are provided along the overlapping portions with a row of holes 30, matching ones of which are engaged by finger bolts 31 so that the operative length of the straps as a unit may be altered.

At the opposite or upper ends, the straps are formed with rigid extensions 32 projecting in alinement toward each other. These extensions abut along their upper portion against the upper portion of the strip 25 as shown in Figure 3 and depend to a level below the lower portion of said strip. Inturned flanges 33 are formed along the bottom edge of the extensions to engage the pan. The upper edge of the extensions is bent inwardly at a downward angle to form sleeves 34 to slidably receive the tongue 28 therein.

The extensions when thus mounted on the strip support the straps 29 in rigid outwardly spaced relation to the pan and said straps being on edge do not tend to sag. Also, the manner of supporting the extension from the pan as above described prevents any vertical movement of said extensions either up or down or any outward deflection of the same, so that they can support a considerable weight, and an extension of the platform 3 to support such weight is unnecessary.

The straps 29 provide a support for a bait pan 35, the usual rim flange 36 of the pan resting on the upper edge of the straps. By reason of the flexibility of the straps and the wide range of adjustment as to the length thereof, together with the sliding adjustment which the extensions 32 may have on the supporting strip, a pan of any size or shape within reason may be used. When once adjusted to position, the extensions 32 are held against sliding movement by means of horizontal latch pin devices 37 slidably mounted on the outside of the straps 29 adjacent the extensions, and adapted to releasably engage adjacent holes 27 in the supporting strip 25.

The bait in the pan 35 serves to attract moths thereto by night as well as by day and being immediately adjacent the pan 1 and on practically the same level, the moths attracted to the bait at night are then attracted to the light and meet their end in the oil, as previously described. This combination of the bait pan and exterminator is of great importance. The moths are most active when the temperature is 60° Fahrenheit, or better. At this temperature fruit or other bait in the bait pan throws off fumes which are dispersed in all directions by the air currents moving about the exterminator. The moths are attracted by the fumes and move toward the bait pan whether or not they are at first attracted by the light. Then, as they near the pan, the light proves a compelling attraction and they then move directly to the sphere of the intense light and hence to their death. From sundown and for about two hours thereafter is the time during which the exterminator proves most effective.

If the use of the bait pan is not desired at any time, it can be removed, together with the supporting strap unit. If the purchaser does not desire the bait pan attachment, the strip 25 is left off the device when it is sold to him.

Although I have shown and described this device as being particularly designed for orchard use, it is to be understood that its value is not limited to such service, since it can be used at any place where moths are a pest and adjusted to suit individual conditions.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A moth exterminator comprising a pan to contain a liquid, an electric light above the pan, an arm from one end of which said light is suspended extending to and down one side of the pan on the outside thereof, a housing fixed on said side of the pan and through which the adjacent portion of the arm projects, yokes about the arm within the housing, means applied to the yokes and including axially alined elements turnably mounted in the sides of the housing parallel to the adjacent side of the pan to pull said yokes in opposite directions axially of said elements, an additional yoke about the arm in vertically spaced relation to the first named yokes and means between said last named yoke and the housing to swing the arm about said swivel elements as an axis.

2. A device as in claim 1, in which the arm is slidable and turnable in the yokes.

3. A moth exterminator comprising a main pan to contain a liquid, a source of artificial light mounted above the pan in overhanging relation to the liquid, an additional pan to contain bait, a supporting strap about said additional pan, and means for removably mounting said additional pan on one side of the main pan.

4. A device as in claim 3, in which said strap is extensible to alter the area outlined thereby, whereby to accommodate bait pans of different sizes.

5. A moth exterminator comprising a main pan to contain a liquid, and a source of artificial light mounted above the pan in overhanging relation to the liquid, an additional pan to contain bait, a supporting strap about said additional pan, extensions at the ends of the straps projecting toward each other, and means slidably supporting said extensions on one side of the main pan.

6. A moth exterminator comprising a pan to contain a liquid, and a source of artificial light mounted above the pan in overhanging relation to the liquid, an additional pan to contain bait, a supporting strap about said additional pan, extensions at the ends of the straps projecting toward each other, a strip mounted on one side of the first named pan, and cooperating supporting elements on the extensions and strip slidably engaging each other.

7. A structure as in claim 6, with releasable catch means between the strap and strip to hold the extensions against sliding movement along the strip.

8. An insect exterminator comprising a pan to contain a liquid, a source of artificial light mounted above the pan substantially centrally thereof in overhanging relation to the liquid and arranged to throw rays in opposed horizontal directions, and reflectors mounted in connection with the pan adjacent the edges thereof in position to catch and reflect certain of said horizontal rays from the light in opposed substantially horizontal directions.

9. An insect exterminator comprising a pan to contain a liquid, a source of artificial light mounted above the pan substantially centrally thereof in overhanging relation to the liquid and arranged to throw direct rays in opposed horizontal directions, and reflectors mounted in connection with the pan adjacent the opposite edges thereof in oppositely disposed and offset relation to said direct rays in position to catch and reflect other rays from the light in opposed horizontal directions substantially parallel to and laterally spaced from said direct rays.

BECKMAN B. GREEN.